(12) United States Patent
Brown

(10) Patent No.: US 11,713,966 B2
(45) Date of Patent: Aug. 1, 2023

(54) CONDUIT LEVEL METHOD AND APPARATUS

(71) Applicant: Patrick James Brown, St. Louis, MO (US)

(72) Inventor: Patrick James Brown, St. Louis, MO (US)

( * ) Notice: Subject to any disclaimer, the term of this patent is extended or adjusted under 35 U.S.C. 154(b) by 0 days.

(21) Appl. No.: 17/720,667

(22) Filed: Apr. 14, 2022

(65) Prior Publication Data

US 2022/0341734 A1 Oct. 27, 2022

Related U.S. Application Data

(60) Provisional application No. 63/258,343, filed on Apr. 26, 2021.

(51) Int. Cl.
| | | |
|---|---|---|
| *G01C 9/34* | (2006.01) | |
| *G01C 9/32* | (2006.01) | |
| *G01C 9/12* | (2006.01) | |

(52) U.S. Cl.
CPC ............ *G01C 9/32* (2013.01); *G01C 9/12* (2013.01); *G01C 9/34* (2013.01)

(58) Field of Classification Search
CPC ..................................................... G01C 9/24
USPC .................................. 33/373, 381, 382, 389
See application file for complete search history.

(56) References Cited

U.S. PATENT DOCUMENTS

| | | | | | |
|---|---|---|---|---|---|
| 3,456,354 | A | * | 7/1969 | Wright ................. | G01C 9/34 |
| | | | | | 33/381 |
| 4,168,578 | A | * | 9/1979 | VanderWerf ........... | G01C 9/28 |
| | | | | | 33/382 |
| 5,421,094 | A | * | 6/1995 | McCord .................. | G01C 9/28 |
| | | | | | 33/388 |
| 6,029,359 | A | * | 2/2000 | Szumer .................. | G01C 9/28 |
| | | | | | 33/465 |
| 6,332,277 | B1 | * | 12/2001 | Owoc .................... | G01C 9/28 |
| | | | | | 33/373 |
| 6,568,095 | B2 | * | 5/2003 | Snyder .................. | G01C 9/28 |
| | | | | | 33/DIG. 1 |
| 6,836,973 | B1 | * | 1/2005 | Eccles, Jr. ............. | G01C 9/28 |
| | | | | | 33/382 |
| 8,061,051 | B2 | * | 11/2011 | Allemand .............. | G01C 9/34 |
| | | | | | D10/69 |
| 9,347,774 | B2 | * | 5/2016 | Christianson ......... | G01C 9/28 |
| 9,389,075 | B2 | * | 7/2016 | De Cino ................ | G01C 9/34 |
| 9,885,571 | B2 | * | 2/2018 | Hoppe ................... | G01C 9/34 |
| 9,885,572 | B2 | * | 2/2018 | Schwoegler .......... | G01C 9/34 |
| 9,964,407 | B2 | * | 5/2018 | Captarencu ........... | G01C 9/28 |

(Continued)

*Primary Examiner* — George B Bennett
(74) *Attorney, Agent, or Firm* — Hodgson Russ LLP

(57) ABSTRACT

A conduit level for determination of conduit bend angles includes a frame supporting a plurality of bubble levels at various angular orientations. The frame has first and second opposite sides, a bottom edge extending along an axis, a top edge, and a front end edge connecting the bottom edge and the top edge. Each of the bubble level sensors has a unique angular orientation relative to the axis of the bottom edge of the frame. The frame includes at least one bubble viewing slot allowing a user to view the plurality of bubble levels in edgewise viewing directions facing the top edge and the front edge of the frame, and a plurality of bubble viewing windows allowing the user to view the plurality of bubble levels in a sidewise viewing direction facing at least one of the sides of the frame.

12 Claims, 6 Drawing Sheets

(56) References Cited

U.S. PATENT DOCUMENTS

| | | | |
|---|---|---|---|
| 10,422,638 B2* | 9/2019 | Burge | G01C 9/02 |
| 10,634,493 B2* | 4/2020 | Norris | G01C 9/16 |
| 10,935,380 B2* | 3/2021 | Cochran | G01C 9/24 |
| 10,969,213 B1* | 4/2021 | Silberberg | G01C 9/34 |
| 11,415,413 B2* | 8/2022 | Cook | G01C 9/34 |
| 2018/0120104 A1* | 5/2018 | Liao | G01C 9/28 |
| 2019/0257649 A1* | 8/2019 | Cochran | G01C 9/28 |
| 2022/0026190 A1* | 1/2022 | Jones | G01B 3/566 |
| 2023/0103815 A1* | 4/2023 | Roels | G01P 15/18 |
| | | | 73/493 |

* cited by examiner

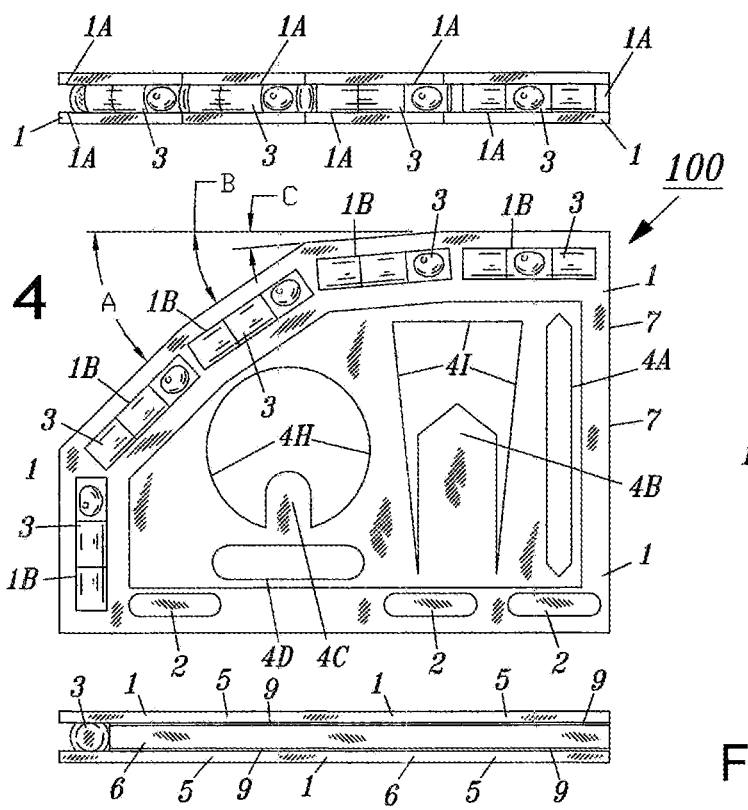

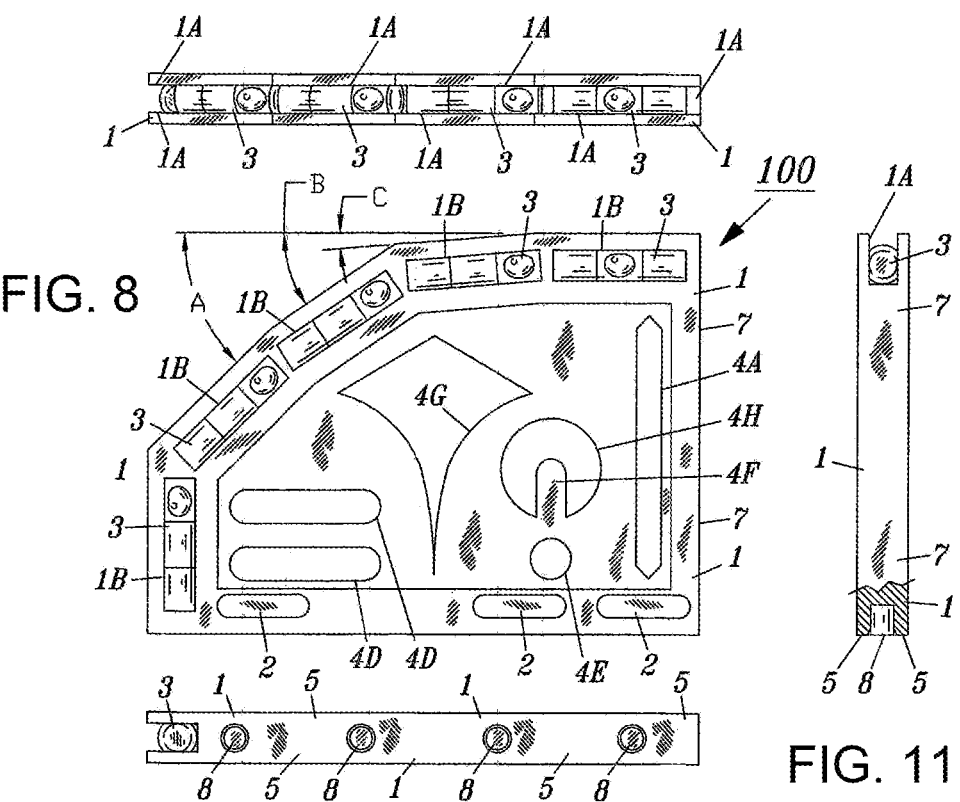

CONDUIT LEVEL METHOD AND APPARATUS

CROSS REFERENCE TO RELATED APPLICATION

The present application claims priority to and benefit of U.S. Provisional Patent Application No. 63/258,343 filed Apr. 26, 2021, the entire disclosure of which is incorporated herein by reference.

BACKGROUND

This disclosure facilitates ascertaining conduit bend angles throughout a conduit bending process, for example bending a conduit for electrical wiring. Current practice in bending conduits such as those used to channel electrical wiring is to use bubble levels common to the carpentry trade. They are awkward to use, hard to read at times, and cumbersome to transport in the context of electrical wiring applications.

BRIEF SUMMARY OF THE DISCLOSURE

As will be seen in the subsequent description, the present disclosure overcomes the deficiencies in current bending levels and bending level practices with regard to electrical wiring conduits.

A conduit level useful for, but not restricted to, the determination of conduit bend angles by electricians in construction wire conduits generally comprises a frame supporting a plurality of bubble levels at various angular orientations. The frame has a first side, a second side opposite the first side, a bottom edge extending along an axis, a top edge, and a front end edge connecting the bottom edge and the top edge. Each of the plurality of bubble level sensors has a unique angular orientation relative to the axis of the bottom edge of the frame. The frame includes at least one bubble viewing slot allowing a user to view the plurality of bubble levels in edgewise viewing directions facing the top edge of the frame and the front edge of the frame. The frame also includes a plurality of bubble viewing windows allowing the user to view the plurality of bubble levels in a sidewise viewing direction facing at least one of the first side of the frame and the second side of the frame.

The at least one bubble viewing slot may be a continuous viewing slot extending along the top edge of the frame and the front edge of the frame, or it may be discontinuous multiple viewing slots along such frame edges.

The plurality of bubble viewing windows may be provided through both the first side and the second side of the frame to allow the user to view the plurality of bubble levels from either side of the frame.

The disclosure further provides structures for helping to secure the portion of the conduit to the bottom edge of the frame during use by frictional contact, magnetic attraction, and or with tie downs.

BRIEF DESCRIPTION OF THE SEVERAL VIEWS OF THE DRAWINGS

FIG. 4 is a side elevational view of the conduit level shown in FIG. 1;

FIG. 5 is a top plan view of the conduit level shown in FIG. 1;

FIG. 6 is a bottom plan view of the conduit level shown in FIG. 1;

FIG. 7 is an end elevational view of the conduit level shown in FIG. 1;

FIG. 8 is a side elevational view illustrating a variant of the conduit level shown in FIG. 1, wherein tie down clearances and tie down tangs of the conduit level are modified according to an aspect of the present disclosure;

FIG. 9 is a top plan view of the conduit level shown in FIG. 8;

FIG. 10 is a bottom plan view of the conduit level shown in FIG. 8;

FIG. 11 is a partially sectioned end elevational view of the conduit level shown in FIG. 8.

DETAILED DESCRIPTION

Referring to FIGS. 1 through 7, a conduit level 100 comprises a frame 1 which may be formed and assembled from multiple frame pieces, one or more bubble viewing slots 1A extending along a top edge and a front end edge of frame 1, a plurality of bubble level viewing windows 1B formed through at least one and preferably both opposite sides of frame 1, and a plurality of bubble levels 3 visible by a user through bubble viewing slots 1A and through bubble viewing windows 1B. A seen in FIG. 1, bubble viewing slot 1A may be a continuous viewing slot extending along the top edge of the frame and along the front edge of the frame, however bubble viewing slot 1A may be partitioned into multiple shorter bubble viewing slots extending along the top edge of the frame and along the front edge of the frame.

Figure 1:
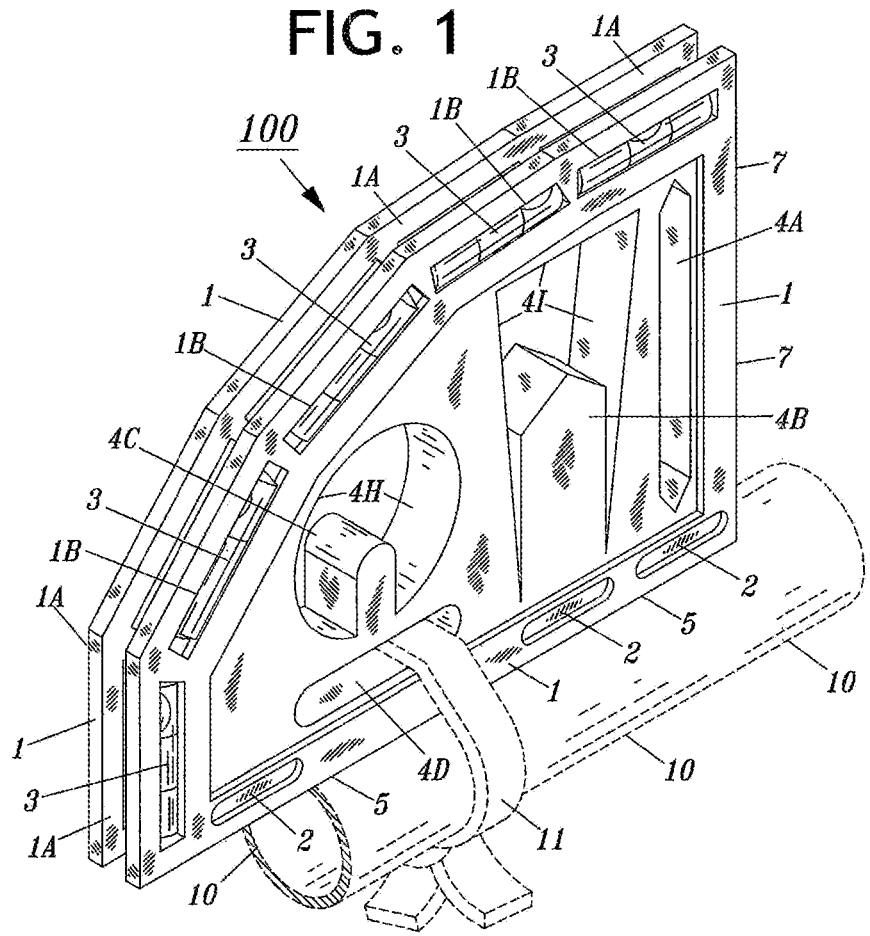
FIG. 1 is a perspective view of a conduit level formed in accordance with an embodiment of the present disclosure, wherein the conduit level is shown attached to a conduit for electrical wiring.
Figure 2:
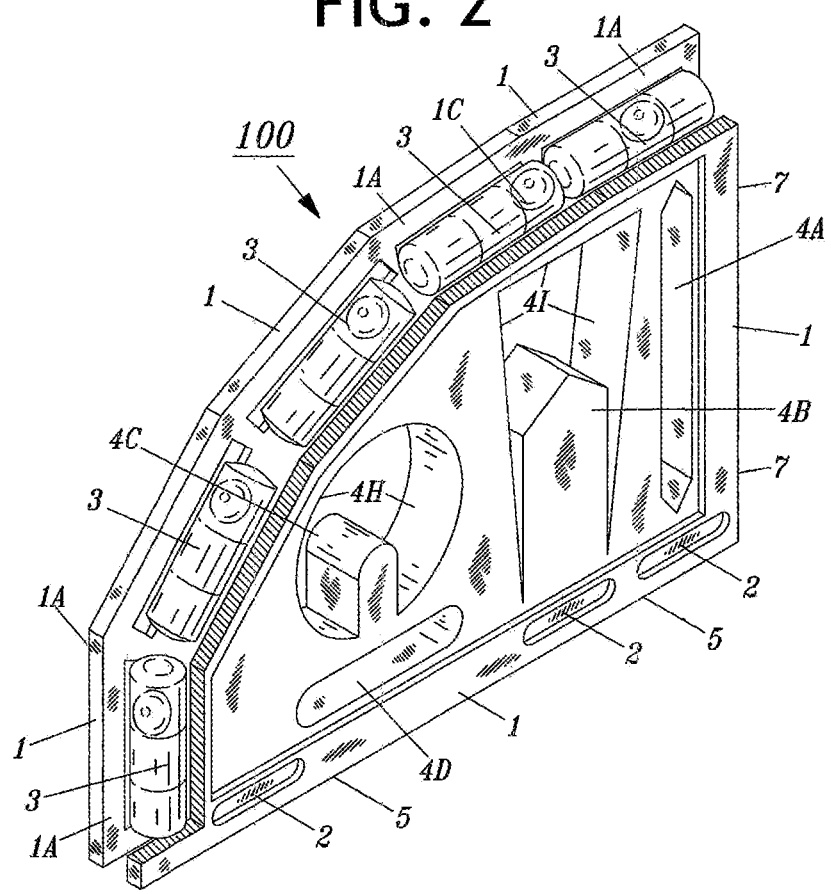
FIG. 2 is a partially sectioned perspective view of the conduit level shown in FIG. 1.
Figure 3:
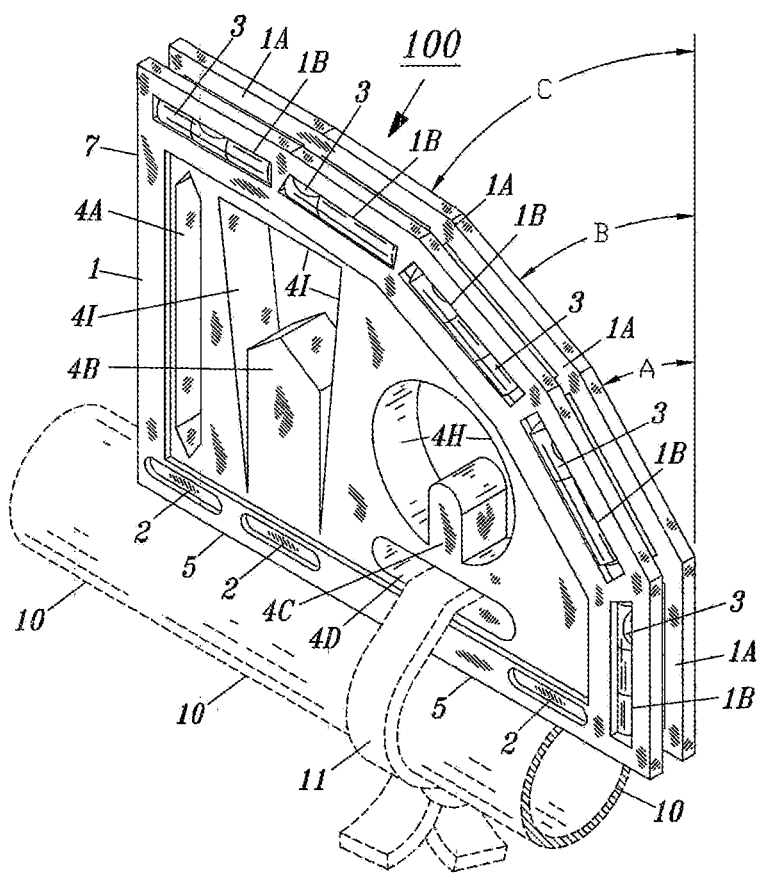
FIG. 3 is another perspective view of the conduit level shown in FIG. 1, wherein the conduit level is again shown attached to a conduit for electrical wiring.

In FIGS. 1 and 3, a portion of a bendable conduit 10 is shown attached to extend axially along a bottom edge of frame 1 which runs perpendicular to the front end edge of frame 1. Conduit 10 is in the nature of a work piece acted upon and bent by a user, such as an electrician or tradesperson, using conduit level 100. As may be understood from the drawings, the plurality of bubble levels 3 are orientated at different and unique respective angular orientations relative to an axis defined by bottom edge 5 of frame 1. For example, proceeding from left to right in FIG. 4, a first bubble level 3 may be orientated at 90° relative to the axis of bottom edge 5, a second bubble level 3 may be orientated at 45° relative to the axis of bottom edge 5, a third bubble level 3 may be orientated at 30° relative to the axis of bottom edge 5, a fourth bubble level 3 may be orientated at 10° relative to the axis of bottom edge 5, and a fifth bubble level 3 may be orientated at 0° relative to the axis of bottom edge 5. The bubble levels 3 may be situated substantially end-to-end to form a generally arcuate or arc-segment arrangement of bubble levels 3 in conduit level 100. As illustrated in FIG. 4, the top edge of frame 1 may be configured with segments or flats to have angles A, B, and C corresponding to the angular orientations of the second, third, and fourth bubble levels, respectively. While the example angular orientations of bubble levels 3 are chosen to assist with bending conduit 10 according to most common specifications known to applicant, more or fewer bubble levels 3, and bubble levels 3 at other angular orientations, may be provided.

The bubble levels 3 are visible to a user viewing conduit level 100 edgewise of frame 1 along the bubble viewing slots 1A, and are also visible to a user viewing conduit level 100 from a side through bubble viewing windows 1B. A user may attach or simply hold a portion of conduit 10 along the bottom edge of frame 1 adjacent an intended bend location, and tilt conduit level 100 with the conduit portion 10 until the bubble level 3 corresponding to a desired bend angle indicates the bubble is centered by gravity within the bubble level 3. Because bubble levels 3 at various angular orientations are visible to the user through bubble viewing slots 1A and through bubble viewing windows 1B, conduit level 100 is more convenient and efficient for users than current bubble level tools known to applicant.

Frame 1 of conduit level 100 may include structures to help attach and/or position conduit portion 10 to extend along the bottom edge of frame 1.

A strip element 6 may be arranged within a tape channel 9 to extending along and adjacent the bottom edge of frame 1. Strip element 6 may be an adhesive tape element for removably positioning and securing conduit portion 10 against the bottom edge of frame 1. Strip element 6 may have one sticky side having an adhesive layer for adherence within tape channel 9 in the frame 1, and an opposite side layer of a tacky or padded material to enhance frictional contact with conduit portion 10. In an aspect of the present disclosure advantageous in situations where conduit portion 10 is formed of a ferrous material, such as steel, strip element 6 may be formed of a magnetic material having an adhesive layer for adherence to tape channel 9 in the frame 1, available in rolls from hardware stores such as Home Depot®. The magnetic material of strip element 6 attracts conduit portion 10 toward bottom edge 5 when the conduit portion 10 is of a ferrous material, such as steel.

As an alternative or in addition to the use of a magnetic strip element 6, a plurality of magnets 8 may be arranged and held within a plurality of magnet clearances 2 provided in frame 1 at locations along and proximate to bottom edge 5 of frame 1. Magnets 8 attract conduit portion 10 toward bottom edge 5 when the conduit portion 10 is of a ferrous material, such as steel.

As shown in FIG. 4, frame 1 may include one or more tie down clearances or openings 4A, 4D, 4H, and 4I through the opposite sides of frame 1. Frame 1 may further include tie down tangs associated with some or all of the tie down openings, for example a tie down tang 4B associated with tie down opening 4I and a tie down tang 4C associated with tie down opening 4H. The tie down openings and tie down tangs may be especially advantageous where conduit portion 10 is formed of a nonferrous material, such as plastic or aluminum, to permit a flexible band 11, such as, but not restricted to, a plastic tie down band common to the electrical trade for bundling wiring or a cross-linked polymer band, to be routed through a tie down opening as shown in FIGS. 1 and 3 to help secure conduit portion 10 against bottom edge 5.

FIGS. 8-11 illustrate a variant of the embodiment shown in FIGS. 1-7 wherein the shape, location, and/or configuration of some of the tie down openings is modified and its associated tie down tang is removed according to an aspect of the disclosure. As best seen in FIG. 8, frame 1 is modified to include a tie down opening 4G. Tie down opening 4H is scaled down and relocated toward a back end edge 7 of frame 1, and has an associated tie down tang 4F. Other geometric configurations of tie down openings and tie down tangs are within the scope of this disclosure.

Figure 12:
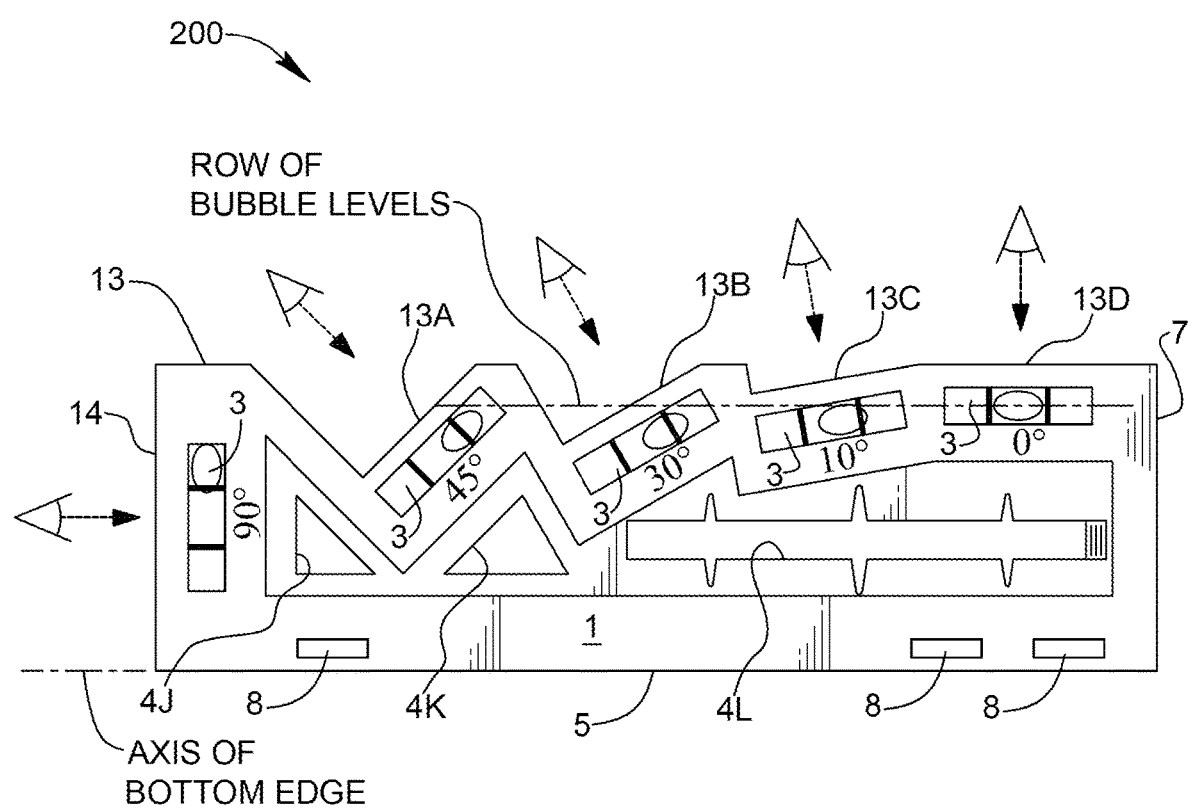
FIG. 12 is a side elevational view of a conduit level formed in accordance with another embodiment of the present disclosure.

FIG. 12 illustrates a conduit level 200 formed in accordance with another embodiment of the present disclosure. Conduit level 200 may constructed similar to conduit level 100 of the initial embodiment for ease of user viewing and attachment to a conduit portion 10. In conduit level 200, all but one of the bubble levels 3 are arranged in a row along frame 1 generally parallel to the axis defined by bottom edge 5, in contrast to the generally arcuate or arc-segment arrangement of bubble levels 3 in conduit level 100. The location of the leftmost bubble level 3 (the bubble level having a 90° angular orientation) may be shifted upward toward top edge 13 so that it is also arranged in the row with the other bubble levels. The top edge 13 of frame 1 may be configured in a "sawtooth" manner defining a series of segments or flats 13A-13D each extending parallel to the angular orientation of a particular bubble level 3 within frame 1. Each bubble level 3 may be provided with an angle label indicating the angular orientation of such bubble level and degree of bend angle to be achieved by reference to such bubble level. A front end edge 14 of frame 1 may extend at a right angle from bottom edge 5.

As with the bubble levels 3 in conduit level 100 of the initial embodiment, bubble levels 3 of conduit level 200 are visible to a user viewing conduit level 200 edgewise of frame 1 toward bubble viewing slots 1A, and are also visible to a user viewing conduit level 200 from a side through bubble viewing windows 1B, although reference to bubble viewing slots 1A and bubble viewing windows 1B is omitted from FIG. 12 for sake of clarity.

Conduit level 200 may include and adapt selected features from conduit level 100 for attachment of conduit portion 10 along bottom edge 5. By way of non-limiting example, frame 1 of conduit level 200 may include tie down openings 4J, 4K, and 4L, and magnets 8.

Conduit levels 100 and 200 may be sized to fit in a work shirt chest pocket. This is a most convenient way to carry the conduit level as compared to levels now in use.

While the present disclosure describes exemplary embodiments, the detailed description is not intended to limit the scope of the appended claims to the particular embodiments set forth. The claims are intended to cover such alternatives, modifications and equivalents of the described embodiments as may be included within the scope of the claims.

What is claimed is:

1. A conduit level for use in bending a portion of a conduit relative to another portion of the conduit, the conduit level comprising:
   a frame having a first side, a second side opposite the first side, a bottom edge extending along an axis, a top edge, and a front end edge connecting the bottom edge and the top edge; and
   a plurality of bubble levels supported by the frame, each of the plurality of bubble levels having a unique angular orientation relative to the axis of the bottom edge;
   wherein the frame includes at least one bubble viewing slot allowing a user to view the plurality of bubble levels in viewing directions facing the top edge of the frame and the front edge of the frame; and
   wherein the frame includes a plurality of bubble viewing windows allowing a user to view the plurality of bubble levels in a viewing direction facing at least one of the first side of the frame and the second side of the frame.

2. The conduit level according to claim 1, wherein the at least one bubble viewing slot is a continuous viewing slot extending along the top edge of the frame and the front edge of the frame.

3. The conduit level according to claim 1, wherein the plurality of bubble viewing windows allow the user to view the plurality of bubble levels in a first viewing direction facing the first side of the frame and in a second viewing direction facing the second side of the frame.

4. The conduit level according to claim 1, wherein the plurality of bubble levels are arranged along a generally arcuate or arc-segment configuration.

5. The conduit level according to claim 4, wherein the plurality of bubble levels includes a first bubble level having a 90° angular orientation relative to the axis of the bottom edge, a second bubble level having a 45° angular orientation relative to the axis of the bottom edge, a third bubble level having a 30° angular orientation relative to the axis of the bottom edge, a fourth bubble level having a 10° angular orientation relative to the axis of the bottom edge, and a fifth bubble level having a 0° angular orientation relative to the axis of the bottom edge.

6. The conduit level according to claim 1, wherein at least some of the plurality of bubble levels are arranged along a row parallel to the axis of the bottom edge.

7. The conduit level according to claim 6, wherein the plurality of bubble levels includes a first bubble level having a 90° angular orientation relative to the axis of the bottom edge, a second bubble level having a 45° angular orientation relative to the axis of the bottom edge, a third bubble level having a 30° angular orientation relative to the axis of the bottom edge, a fourth bubble level having a 10° angular orientation relative to the axis of the bottom edge, and a fifth bubble level having a 0° angular orientation relative to the axis of the bottom edge.

8. The conduit level according to claim 1, further comprising a strip element extending along and adjacent to the bottom edge of the frame, wherein the strip element enhances frictional contact between the bottom edge of the frame and the portion of the conduit.

9. The conduit level according to claim 1, further comprising a strip element extending along and adjacent to the bottom edge of the frame, wherein the strip element includes magnetic material which attracts the portion of the conduit toward the bottom edge of the frame when the portion of the conduit is of a ferrous material.

10. The conduit level according to claim 1, further comprising a plurality of magnets supported by the frame at respective locations along and proximate to the bottom edge of the frame, wherein the plurality of magnets attract the portion of the conduit toward the bottom edge of the frame when the portion of the conduit is of a ferrous material.

11. The conduit level according to claim 1, wherein the frame includes at least one tie down opening though the first side and the second side of the frame.

12. The conduit level according to claim 11, wherein the frame further includes a tie down tang associated with the at least one tie down opening.

\* \* \* \* \*